United States Patent
Kitayoshi

(10) Patent No.: US 6,433,453 B1
(45) Date of Patent: Aug. 13, 2002

(54) REVOLVING SPEED INCREASING APPARATUS

(76) Inventor: Yohei Kitayoshi, Coto Plandol 102, 173-6, Okuramachi, Machida-shi, Tokyo (JP)

( * ) Notice: Subject to any disclaimer, the term of this patent is extended or adjusted under 35 U.S.C. 154(b) by 0 days.

(21) Appl. No.: 09/598,252

(22) Filed: Jun. 21, 2000

(30) Foreign Application Priority Data

Feb. 21, 2000 (JP) ........................................ 2000-042985

(51) Int. Cl.$^7$ ...................... H02K 16/00; H02K 16/02; H02K 21/00; H02K 21/12; H02K 13/04; H02K 1/22; H02K 3/46
(52) U.S. Cl. .................. 310/156.01; 310/264; 310/113; 310/152; 310/237; 310/270; 310/156.19; 310/156.38; 310/156.32; 310/156.46
(58) Field of Search ................................. 310/269, 150, 310/90.5, 52, 168, 68 B, 154.26, 156.46, 156.43, 156.38, 152, 112, 113, 114; 290/45

(56) References Cited

U.S. PATENT DOCUMENTS

| | | | |
|---|---|---|---|
| 3,609,426 A | * 9/1971 | Gaul | 310/112 |
| 3,895,245 A | * 7/1975 | Bode | 310/46 |
| 4,011,477 A | * 3/1977 | Scholin | 310/80 |
| 4,300,641 A | * 11/1981 | Kinkel | 173/12 |
| 4,371,798 A | * 2/1983 | Kuroda | 310/80 |
| 4,469,970 A | * 9/1984 | Neumann | 310/156 |
| 4,484,083 A | * 11/1984 | Jefferies | 290/45 |
| 4,531,379 A | * 7/1985 | Diefenthaler, Jr. | 62/236 |
| 5,350,958 A | * 9/1994 | Ohnishi | 310/52 |
| 5,796,195 A | * 8/1998 | Miyakawa | 310/68 B |
| 5,821,710 A | * 10/1998 | Masuzawa et al. | 318/254 |
| 5,831,362 A | * 11/1998 | Che et al. | 310/90.5 |
| 5,831,365 A | * 11/1998 | Keim et al. | 310/156 |
| 5,841,211 A | * 11/1998 | Boyes | 310/90 |
| 6,121,706 A | * 9/2000 | Nashiki et al. | 310/168 |
| 6,144,130 A | * 11/2000 | Kawamura | 310/156 |
| 6,157,112 A | * 12/2000 | Suzuki et al. | 310/269 |
| 6,232,689 B1 | * 5/2001 | Fujita et al. | 310/103 |

* cited by examiner

Primary Examiner—Nestor Ramirez
Assistant Examiner—Julio R. Gonzalez
(74) Attorney, Agent, or Firm—Wenderoth, Lind & Ponack, L.L.P.

(57) ABSTRACT

A revolving speed increasing apparatus in which the repulsion of the magnets acts effectively only in the rotational direction to increase the revolving speed by the magnets. A rotary plate, fixed to a rotary shaft so as to integrally rotate, and a fixed plate, fixed to a stationary portion, are opposed to each other. A plurality of radially arranged elongated magnets provided at equal intervals, magnets for demagnetization fixed to the elongated magnets on one side thereof so as to protrude from the tips of the elongated magnets, and plate magnets arranged between the adjacent elongated magnets are provided on the opposed surfaces of the rotary plate and fixed plate. The rotary plate and the fixed plate are arranged with a rotational gap between the tip surfaces of the magnets for demagnetization. The poles at the opposed tips of the elongated magnets on the rotary plate and those on the fixed plate are of the same polarity. The number of the elongated magnets provided on the rotary plate is different from the number of those on the fixed plate.

5 Claims, 4 Drawing Sheets

REVOLVING SPEED INCREASING APPARATUS

BACKGROUND OF THE INVENTION

This invention relates to a revolving speed increasing apparatus which can increase the revolving speed using the magnetic force of magnets arranged such that their poles of the same polarity oppose each other.

Motors and engines used as drive sources are designed to produce predetermined revolutions according to the operating conditions. But since the revolution at the maximum output is determined, if a large number of revolutions is needed to drive various machines, it is necessary to use a large-sized, large-output motor or engine.

Thus, in order to reduce the size of a driving source relative to the revolutions needed, one may think of using a device for increasing revolutions midway of the rotation transmission path. One example is a device designed to increase revolutions using magnetic repulsion.

As a conventional device used to increase revolutions using magnetic repulsion, there is one having a structure in which a plurality of magnets are fixed to a rotary plate fixed to both a rotary shaft and a nonrotatable fixed plate in an annular arrangement so that their magnetized end faces oppose each other, and the magnetic poles of the magnets fixed to the rotary plate and the magnets fixed to the fixed plate are set so that the poles at the opposed ends are of the same polarity to produce repulsion between the magnets on the rotary plate and the fixed plate when the magnets on the rotary plate rotate, thereby increasing the revolving speed by adding the repulsion to the rotational force.

With such a device using magnets, when the magnets fixed to the rotary plate approach the magnets on the fixed plate, the repulsion between the magnets acts as a brake or a load on the driving source. Thus actually, it is impossible to increase the revolving speed.

An object of the invention is to provide a revolving speed increasing apparatus in which the repulsion between the magnets acts effectively only in the rotational direction to increase the revolving speed.

SUMMARY OF THE INVENTION

According to the invention, there is provided a revolving speed increasing apparatus comprising a rotary shaft, a plate fixed to the rotary shaft so as to integrally rotate, a fixed plate fixed to a fixed portion and opposed to the rotary plate, a plurality of elongated magnets radially arranged at regular intervals, magnets for demagnetization fixed at the tips of the elongated magnets on one side thereof so as to protrude from the ends of the elongated magnets, and plate magnets arranged between the adjacent elongated magnets, the elongated magnets, the magnets for demagnetization and the plate magnets being provided on the opposed surfaces of the rotary plate and the fixed plate, the rotary plate and the fixed plate being arranged with a rotational gap between the tip surfaces of the magnets for demagnetization on both of them, wherein the poles at the opposed tips of the elongated magnets on the rotary plate and on the fixed plate are of the same polarity, and the number of the elongated magnets provided on the rotary plate being different from the number of the elongated magnets provided on the fixed plate.

Other features and objects of the present invention will become apparent from the following description made with reference to the accompanying drawings, in which:

DETAILED DESCRIPTION OF THE PREFERRED EMBODIMENT

Figure 1:
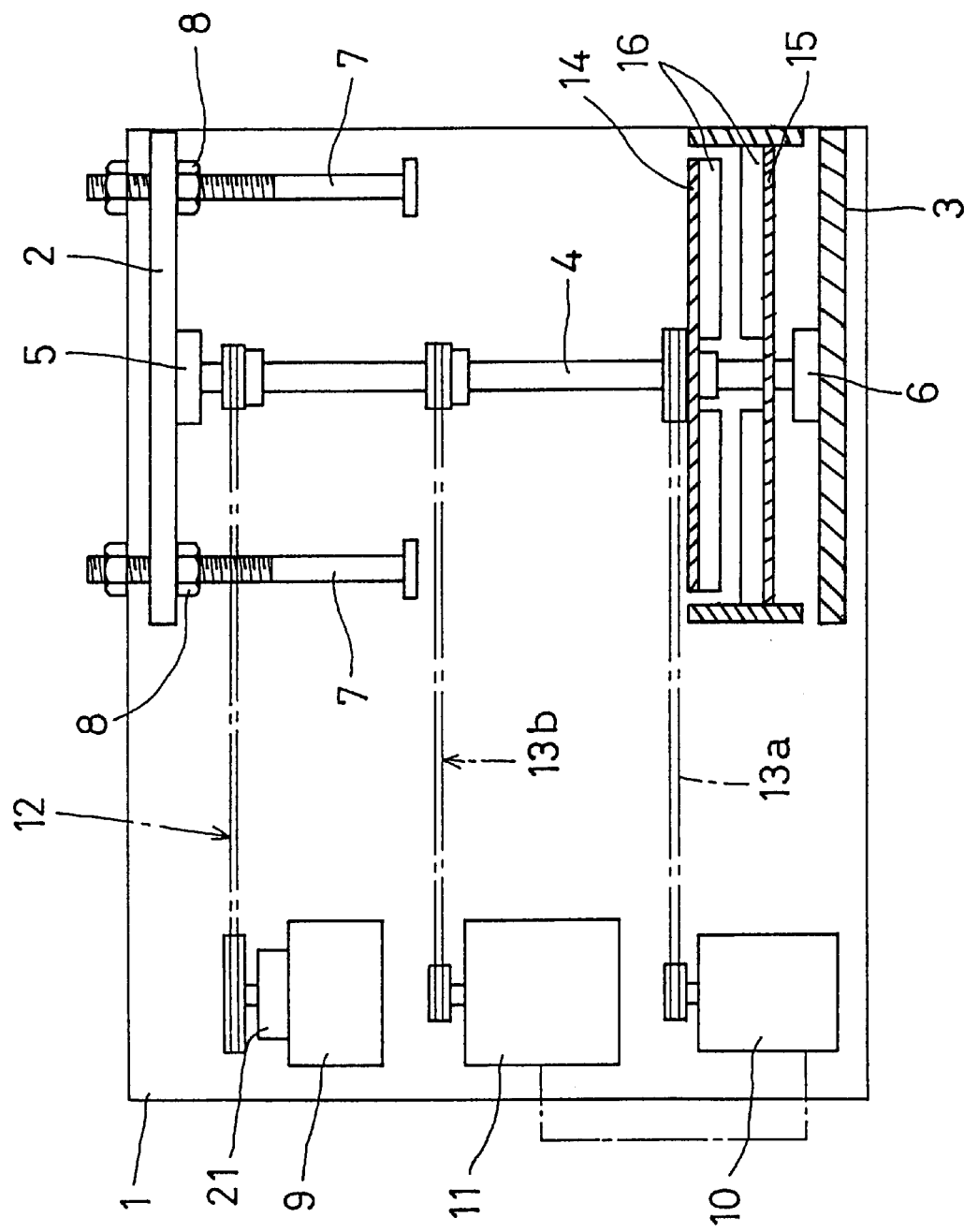
FIG. 1 is a partial sectional front view of a revolving speed increasing apparatus embodying the invention.

Hereinbelow, the embodiment of this invention is described with reference to the drawings.

The revolving speed increasing apparatus of this invention has upper and lower support plates 2, 3 arranged opposite to each other on an upright frame 1. A vertical rotary shaft 4 arranged between the support plates 2, 3 is supported through bearings 5, 6 so as to be vertically position-adjustable, hanged from the bearing 5 on the upper support plate 2. Threaded shafts 7 extending vertically through four corners of the upper support plate 2 are provided on the frame 1. The vertical position of the rotary shaft 4 is adjustable by adjusting the vertical position of the upper support plate 2 by turning nuts 8 threaded onto the threaded shafts 7.

A driving motor 9, an auxiliary motor 10 and a generator 11 are coupled to the rotary shaft 4 through rotation transmission means such as belts 12, 13a and 13b, respectively. A disk-shaped rotary plate 14 which integrally rotates with the rotary shaft 4 is fixed to the rotary shaft. Under the rotary plate 14, a fixed plate 15 which is coaxial with the rotary shaft 4 and fixed to the frame 1 is arranged so as to oppose the rotary plate 14.

Figure 2:
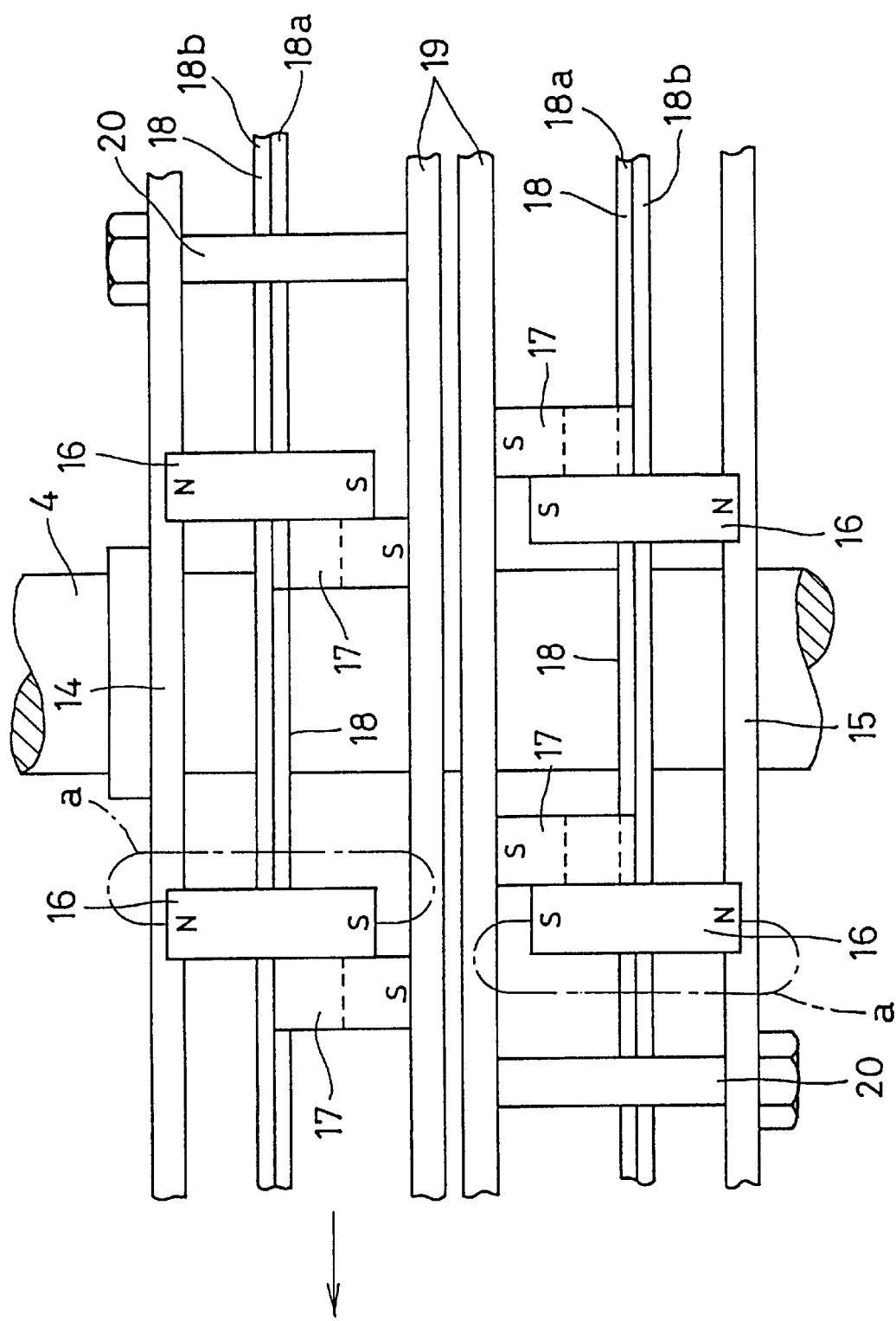
FIG. 2 is an enlarged front view showing a portion of the revolving speed increasing apparatus shown in FIG. 1.
Figure 4A:
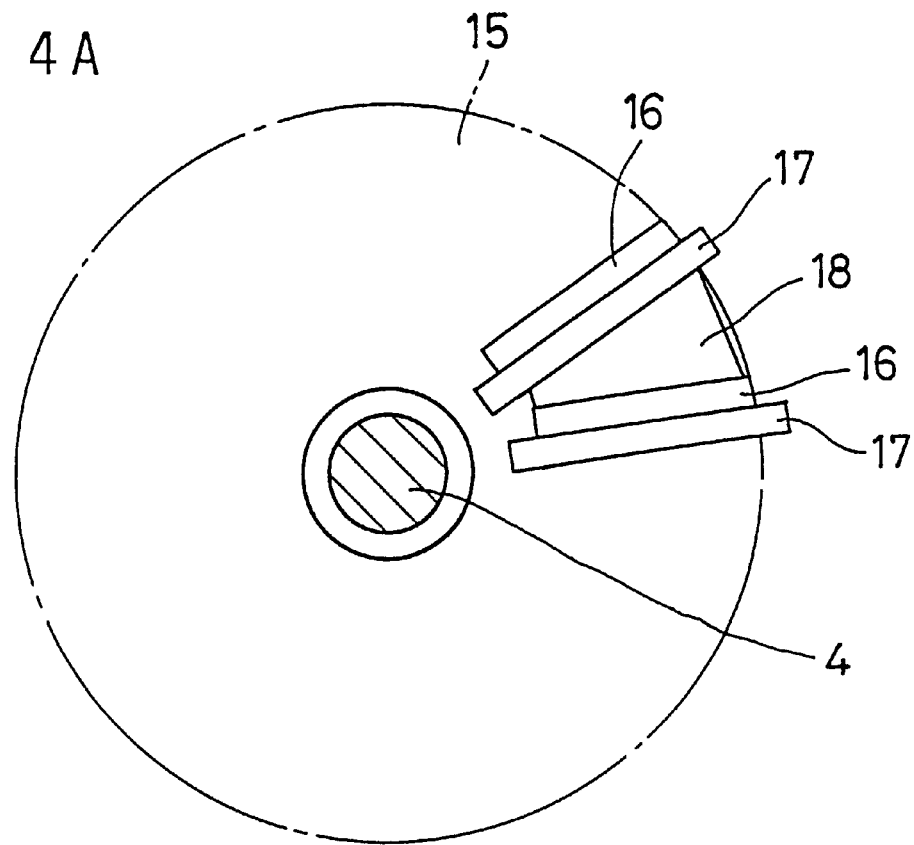
FIG. 4A is a plan view of a fixed plate.
Figure 4B:
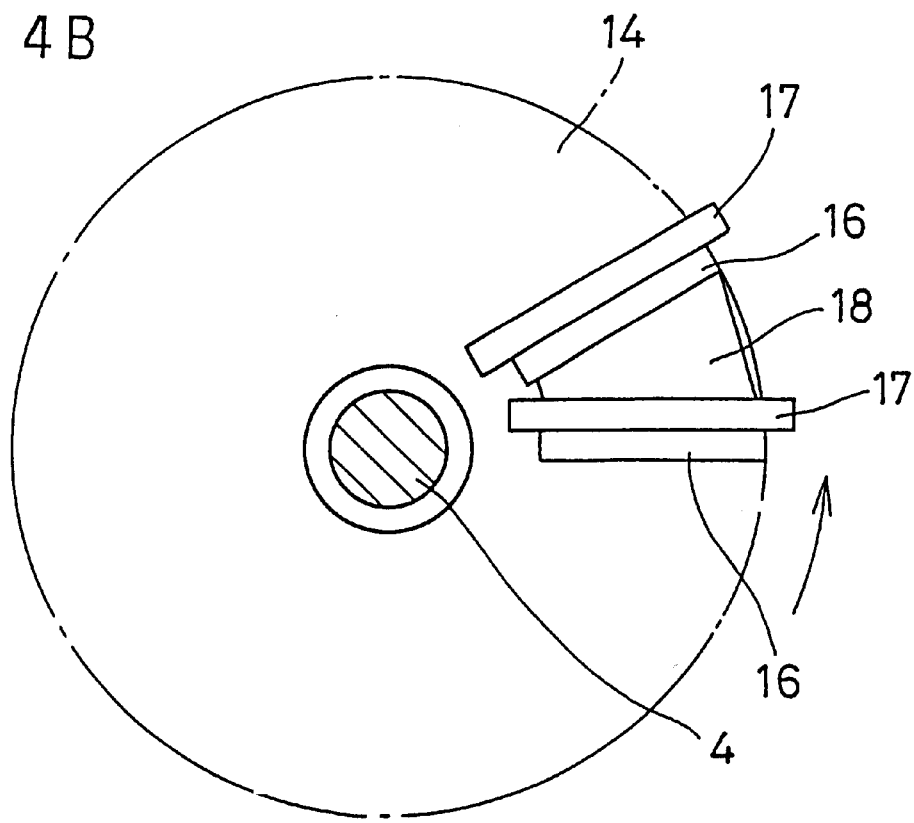
FIG. 4B is a bottom plan view of a rotary plate.

As shown in FIGS. 2 and 4, on each of the opposed surfaces of the rotary plate 14 and the fixed plate 15, a plurality of radially arranged elongated magnets 16, magnets 17 for demagnetization fixed to one side of the elongated magnets 16 so as to protrude from the tips of the magnets 16, and plate magnets 18 arranged between the elongated magnets 16 are provided at regular intervals. The rotary plate 14 and the fixed plate 15 are arranged in an opposed manner so that a gap for rotation is formed between the tips of the magnets 17 for demagnetization. The magnetic poles at the opposed tips of the elongated magnets 16 provided on the rotary plate 14 and the fixed plate 15 have the same polarity. The number of the elongated magnets 16 provided on the rotary plate 14 is different from that of the magnets 16 on the fixed plate 15.

Figure 3:
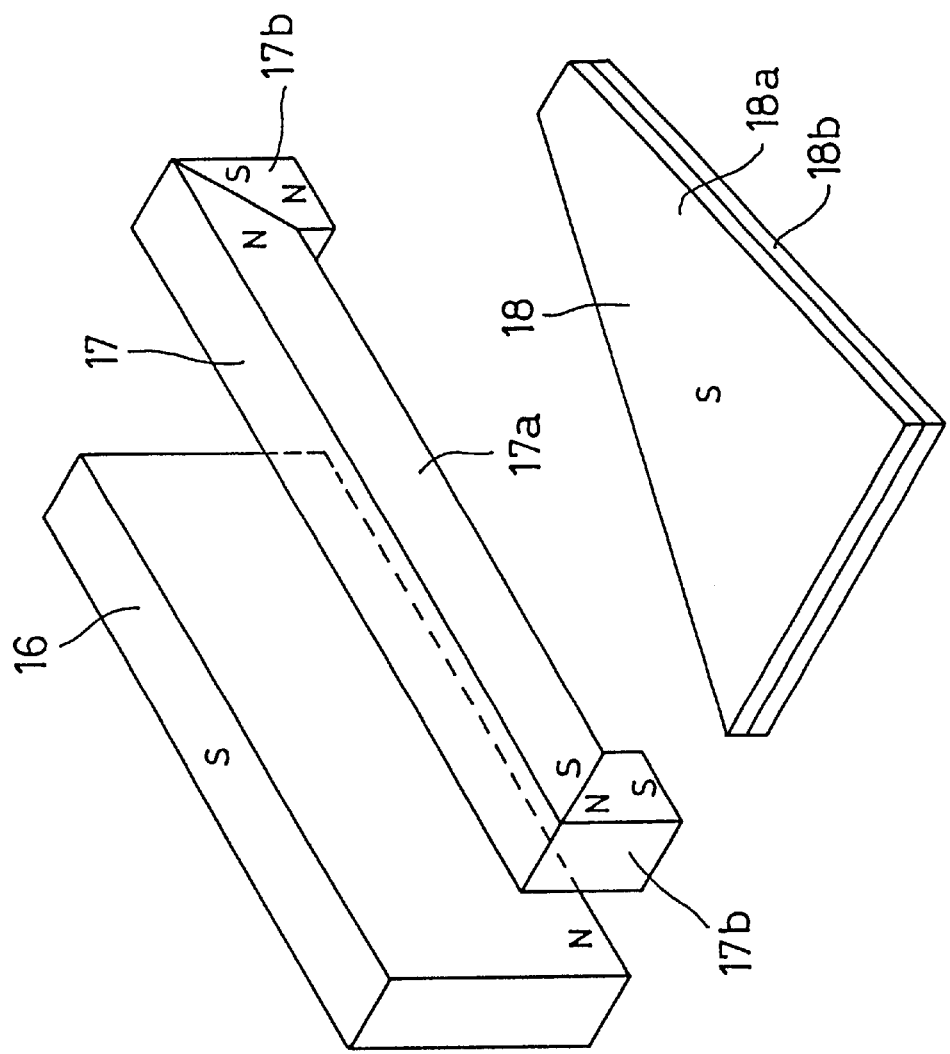
FIG. 3 is an exploded perspective view of a permanent magnet assembly.

FIG. 3 shows a permanent magnet assembly provided on the opposed surfaces of the rotary plate 14 and the fixed plate 15. The rotary plate 14 is formed to have a diameter of 480 mm. The elongated magnets 16 are formed into rectangular magnets 20 mm thick, 150 mm long and 60 mm high. They extend along radial direction of the rotary plate 14 (FIG. 4). A plurality of the magnets 16 are fixed to the rotary plate 14 in a radial arrangement. The poles at the opposed tips of the elongated magnets 16 provided on the rotary plate 14 and those provided on the fixed plate 15 are S poles.

Also, for the magnets 17 for demagnetization, 20-mm-square rod-shaped magnets are used. Both ends of a 190-mm-long rod-shaped magnet 17a are cut or beveled at 45° and the ends of 40-mm-long rod-shaped magnets 17b, which are cut or beveled at 45°, are abutted and fixed to the ends of the magnet 17a to form the magnets 17 for demagnetization into a shallow U-shape (FIG. 3). To the elongated magnets 16, the magnets 17 for demagnetization are superposed on the forward side of the rotational direction of the rotary plate 14 and fixed together (FIG. 4B) so that the S poles at one end of the rod-shaped magnets 17a are located on the outer perimeter of the rotary plate 14 with the magnets 17 protruding by 20 mm from both ends of the elongated magnets 16. The magnets 17 for demagnetization on the fixed plate 15 are fixed to the elongated magnets 16 on the rear side of the rotational direction of the rotary plate 14.

Around the elongated magnets 16, magnetic lines a are produced between S and N poles. But by fixing the magnets 17 for demagnetization to one side of the magnets 16, the magnetic lines a are interrupted on the side of the magnets 17 for demagnetization, so that the magnetic lines are produced only on the side where there are no magnets 17 for demagnetization.

The plate magnets 18 each comprise a 10-mm-thick plate-shaped ferrite magnet 18a and an iron plate 18b superposed on the bottom of the ferrite magnet 18a (FIG. 3), and are shaped into a fan so as to just fit between the adjacent opposed surfaces of the radially arranged elongated magnets 16 and fixed between the adjacent magnets 16 with their S poles facing up. Since the top surface of each plate magnet 18 is the S pole as are the tips of the elongated magnets 16 and the iron plates 18b are superposed on the underside, the iron plates 18b absorb magnetic lines of N poles of the plate magnets 18 and strengthen the magnetic lines of S poles of the elongated magnets 16, so that the repulsion between the elongated magnets 16 increases.

The elongated magnets 16, magnets 17 for demagnetization and plate magnets 18 provided on the fixed plate 15 are of the same dimensions, structure and arrangement as those on the rotary plate 14. But on the rotary plate 14, twelve elongated magnets 16 are arranged at regular intervals, while on the fixed plate 15, thirteen elongated magnets 16 are arranged at regular intervals. Thus, the plate magnets 18 used for the fixed plate 15 are slightly narrower than those for the rotary plate 14.

In FIG. 2, at the opposed surfaces of the rotary plate 14 and fixed plate 15, aluminum disks 19 are superposed on the tip surfaces of the magnets 17 for demagnetization. Also, by fastening the rotary plate 14 and the disks 19 together and fastening the fixed plate 15 and the disks 19 together by bolts 20, the permanent magnet assembly is stabilized with a gap that permits rotation between the opposed surfaces of the disks 19. The disks, however, may be omitted.

In FIG. 1, a rotary plate 14 and a fixed plate 15 are arranged on the rotary shaft 4. However, two or more pairs of rotary plates 14 and fixed plates 15 may be employed.

The revolving speed increasing apparatus of this invention has a structure as described. When the rotary shaft 4 is rotated by actuating the driving motor 9, the permanent magnet assembly on the rotary plate 14 fixed to the rotary shaft 4 rotates at high speed, so that the elongated magnets 16 on the rotary plate 14 repeatedly move toward and away from the elongated magnets 16 on the fixed plate 15.

The driving motor 9 rotates 1440 times per minute and the rotation transmission means 12 using pulleys and a belt transmits the rotation to the rotary shaft 4 at a three-fold speed, so that the rotary shaft 4 rotates 4320 times per minute. Also, the generator 11 needs 3000–8000 revolutions per minute for generation.

Since the magnets 17 for demagnetization are fixed to the elongated magnets 16 in the forward position of the rotational direction of the rotary plate 14 for the rotary plate 14 and in the rearward position of the rotational direction of the rotary plate 14 for the fixed plate 15, the magnetic lines between the S and N poles of the elongated magnets 16 are demagnetized at the front position of the rotational direction for the rotary plate 14, while for the fixed plate 15, the magnetic lines between the S and N poles of the elongated magnets 16 are demagnetized at the rear position of the rotational direction. Thus, the elongated magnets 16 will never produce repulsion force when the elongated magnets 16 on the rotary plate 14 approach the elongated magnets 16 on the fixed plate 15.

As shown in FIG. 2, until tips of both elongated magnets 16 oppose each other, no repulsion is produced. However, when the elongated magnets 16 on the rotary plate 14 move to the rear position of the rotational direction relative to the elongated magnets 16 on the fixed plate 15, the elongated magnets 16 repulse each other due to the magnetic lines. By this repulsion, a rotational force is added to the rotary plate 14. Therefore, the rotation speed of the rotary plate 14 increases.

When the rotary shaft 4 is accelerated and its speed exceeds that of the driving motor 9, a clutch 21 disengages, and the drive of the rotary shaft 4 by the driving motor 9 stops. At this moment, the driving motor is deenergized.

Since the elongated magnets 16 on the fixed plate 15 and the elongated magnets 16 on the rotary plate 14 are of different numbers, the phases of these elongated magnets 16 are arranged unevenly in the rotational direction, so that repulsion between these elongated magnets 16 is always produced at some position to accelerate the rotation of the rotary shaft 4.

As described above, by the rotation of the rotary shaft 4, the generator 11 and the auxiliary motor 10 are driven through the rotation transmission means 13a, 13b. Thus, the generator 11 produces electricity. The power thus produced is used as a power source for the auxiliary motor 10 through a step-up means to drive the rotary shaft 4 by means of the auxiliary motor 10.

While part of the power produced from the generator 11 is used as a power source for the auxiliary motor, redundant power may be sold commercially or used as a power source for homes, factories or shops. Thus, it is economically advantageous as an independent generator.

What is claimed is:

1. A revolving speed increasing apparatus comprising:
    a rotary shaft supported on a support structure so as to be rotatable in a rotation direction;
    a rotary plate fixed on said rotary shaft so as to be rotatable therewith;
    a fixed plate fixed to said support structure and having a surface that is opposed to a surface of said rotary plate;
    a plurality of elongated magnets radially arranged at equal intervals on the opposing surfaces of said rotary and fixed plates;
    a plurality of demagnetizing magnets fixed at the tips of said elongated magnets, respectively, each of said demagnetizing magnets being provided on one side of said respective elongated magnet so as to protrude from the ends of said respective elongated magnet,
    wherein said demagnetizing magnets on said rotary plate are fixed on a front side of said elongated magnets with respect to the rotation direction of said rotary shaft, and
    wherein said demagnetizing magnets on said fixed plate are fixed on a rear side of said elongated magnets with respect to the rotation direction of said rotary shaft;
    a plurality of plate magnets arranged between said elongated magnets that are disposed adjacent to each other on each of said rotary and fixed plates, respectively, wherein said elongated, demagnetizing and plate magnets on said rotary plate are permanent magnets, wherein said elongated, demagnetizing and plate magnets on said fixed plate are permanent magnets, wherein said rotary plate and said fixed plate are positioned so that a gap is formed between tip surfaces of said demagnetizing magnets on said rotary plate and opposing tip surfaces of said demagnetizing magnets on said fixed plate, and wherein poles at opposing tip surfaces of said elongated magnets on said rotary plate and said fixed plate are of the same polarity, and the number of said elongated magnets on said rotary plate is different from the number of said elongated magnets provided on said fixed plate.

2. The revolving speed increasing apparatus as claimed in claim 1, further comprising:

a driving electric motor coupled to said rotary shaft;

an auxiliary electric motor coupled to said rotary shaft;

a generator coupled to said rotary shaft;

rotation transmission means coupling said driving motor, said auxiliary motor and said generator to said rotary shaft; and a clutch provided between said rotary shaft and said driving motor, wherein said rotary shaft is vertically arranged such that its position is vertically adjustable, and said fixed plate is arranged under said rotary plate.

3. A revolving speed increasing apparatus comprising:

a support frame;

an upper support plate adjustably connected to said support frame;

a vertical rotary shaft rotatably supported on said upper support plate so as to be rotatable in a rotation direction, wherein the position said rotary shaft can be adjusted in a vertical direction by adjusting the position of said upper support plate;

a rotary plate integrally connected to said rotary shaft;

a fixed plate fixed to said support frame and having a surface that is opposed to a surface of said rotary plate;

a plurality of elongated magnets radially arranged on the opposing surfaces of said rotary and fixed plates;

a plurality of demagnetizing magnets fixed at the tips of said elongated magnets, respectively, each of said demagnetizing magnets being provided on one side of said respective elongated magnet so as to protrude from the ends of said respective elongated magnet, wherein said demagnetizing magnets on said rotary plate are fixed on a front side of said elongated magnets with respect to the rotation direction of said rotary shaft, and said demagnetizing magnets on said fixed plate are fixed on a rear side of said elongated magnets with respect to the rotation direction of said rotary shaft;

a plurality of plate magnets arranged between adjacent ones of said elongated magnets on each of said rotary and fixed plates, wherein said elongated, demagnetizing and plate magnets on said rotary plate are permanent magnets, wherein said elongated, demagnetizing and plate magnets on said fixed plate are permanent magnets, wherein said rotary plate and said fixed plate are positioned so that a gap is formed between tip surfaces of said demagnetizing magnets on said rotary plate and opposing tip surfaces of said demagnetizing magnets on said fixed plate, and wherein poles at opposing tip surfaces of said elongated magnets on said rotary plate and said fixed plate are of the same polarity, and the number of said elongated magnets on said rotary plate is different from the number of said elongated magnets provided on said fixed plate.

4. The revolving speed increasing apparatus as claimed in claim 3, further comprising:

a driving electric motor coupled to said rotary shaft;

an auxiliary electric motor coupled to said rotary shaft;

a generator coupled to said rotary shaft;

rotation transmission means coupling said driving motor, said auxiliary motor and said generator to said rotary shaft; and a clutch provided between said rotary shaft and said driving motor;

wherein said rotary shaft is vertically arranged in a suspended state such that its position is vertically adjustable, and said fixed plate is arranged under said rotary plate.

5. The revolving speed increasing apparatus as claimed in claim 3, wherein each of said elongated magnets is a rectangular magnet that extends in a radial direction, each of said demagnetizing magnets fixed is a shallow U-shaped magnet, and each of said plate magnets comprises a fan-shaped ferrite magnet and an iron plate superposed on a bottom of said ferrite magnet.

* * * * *